(12) United States Patent
Ross et al.

(10) Patent No.: US 8,320,633 B2
(45) Date of Patent: Nov. 27, 2012

(54) SYSTEM AND METHOD FOR IDENTIFYING PRODUCE

(75) Inventors: Gary A. Ross, Dundee (GB); Michael D. Brunsdon, Edinburgh (GB)

(73) Assignee: NCR Corporation, Duluth, GA (US)

( * ) Notice: Subject to any disclaimer, the term of this patent is extended or adjusted under 35 U.S.C. 154(b) by 428 days.

(21) Appl. No.: 12/626,732

(22) Filed: Nov. 27, 2009

(65) Prior Publication Data
US 2011/0129117 A1    Jun. 2, 2011

(51) Int. Cl.
*G06K 9/00* (2006.01)
(52) U.S. Cl. .................................................. 382/110
(58) Field of Classification Search .............. 382/100, 382/110, 103, 190; 235/383; 356/402–411, 356/426; 209/577, 587; 186/61
See application file for complete search history.

(56) References Cited

U.S. PATENT DOCUMENTS

| | | | | |
|---|---|---|---|---|
| 5,471,311 A | * | 11/1995 | van den Bergh et al. | 356/446 |
| 6,005,965 A | * | 12/1999 | Tsuda et al. | 382/145 |
| 6,069,696 A | * | 5/2000 | McQueen et al. | 356/326 |
| 6,501,547 B1 | * | 12/2002 | Spencer et al. | 356/328 |
| 6,658,138 B1 | * | 12/2003 | Gu et al. | 382/110 |
| 7,319,990 B1 | * | 1/2008 | Henty | 705/400 |
| 2002/0036234 A1 | * | 3/2002 | Tang et al. | 235/454 |

* cited by examiner

*Primary Examiner* — Brian P Werner
*Assistant Examiner* — Shefali Goradia
(74) *Attorney, Agent, or Firm* — Paul W. Martin

(57) ABSTRACT

An apparatus, method and system are presented for identifying produce. Multiple images of a produce item captured using five different types of illumination. The captured images are processed to determine parameters of the produce item and those parameters are compared to parameters of known produce to identify the produce item.

19 Claims, 4 Drawing Sheets

SYSTEM AND METHOD FOR IDENTIFYING PRODUCE

TECHNICAL FIELD

The present invention relates to point of sale (POS) terminals and more specifically to POS terminals that identify produce items presented to the POS terminal for purchase.

BACKGROUND

POS terminals (also known as a checkout terminal and can be either self-service or assisted), such as those used in the retail food industry are well known for their capability to identify labeled items presented for purchase at the terminal. Bar code and RFID readers are some of the devices used by the POS terminal to read labels or RFID tags attached to the items and thus identify each item being purchased. Manufactured items typically are easy to label or tag using automated methods that add only marginal incremental cost to the item.

Produce items present a number of issues that increase the cost associated with labeling each item. Produce items are generally products of nature and as such vary in size, shape and in some cases are easily damaged if improperly handled. These and other attributes of produce make it difficult to design equipment that will automatically label the produce items. As a result, produce items may not be labeled or the application of labels results in more than a marginal increase in the cost of the items.

When a produce item that is not labeled is presented for purchase, typically the person operating the POS terminal must identify the item and communicate the identity to the POS terminal or enter the actually price into the POS terminal. This increases the time required to complete the checkout process and increases the potential for pricing errors and misidentified.

Therefore, it would be desirable to provide a POS terminal that improves the speed and accuracy of identifying unlabeled produce items presented for purchase.

SUMMARY

A produce identification apparatus, method and system are provided to generally overcome the above limitations.

In one embodiment, a produce identification apparatus is provided identifying a produce item presented for identification. The apparatus includes a processor that controls the elements and functions of the apparatus. Illumination devices, controlled by the processor, illuminate the produce item. The illumination devices consist of multiple types of illumination devices where each type is designed to emit light energy at a different primary wavelength. Multiple images of the produce item are captured for processing where each image is illuminated with a different primary wavelength of light. The processor mathematically processes the images to determine certain characteristics of the produce item. The characteristics are then compared to characteristics of known produce items until a match is found and the produce item is identified.

DETAILED DESCRIPTION

Figure 1:
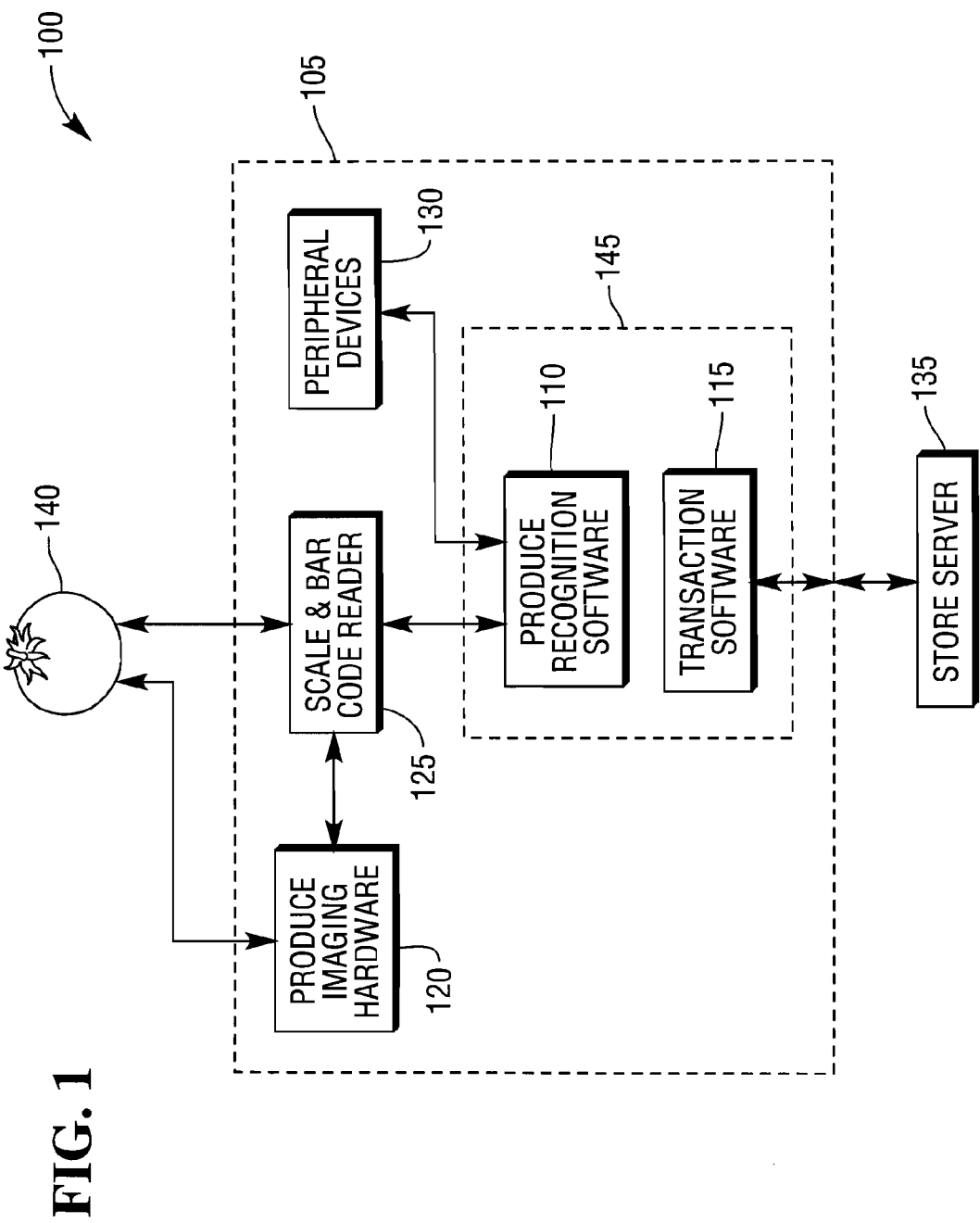
FIG. 1 illustrates a high-level block diagram of an exemplar point of sale system.

Referring now to FIG. 1, there is provided a high level block diagram of an exemplar point of sale (POS) system 100. The POS system 100 includes a store server 135 and a POS terminal 105 that includes a scale and bar code reader 125 and other peripheral devices 130. The bar code reader portion of the scale and bar code reader 125 reads bar codes presented to the POS terminal 105 for sale. The scale portion is used to weigh items such as produce that are most often sold by weight.

The POS terminal 105 includes a processor module 145 that executes transaction software 115 that controls the operation of the POS terminal 105. The processor module 145 further executes produce recognition software 110 that controls the produce imaging hardware 120 and implements the produce recognition feature of the POS terminal 105. An unlabeled produce item, in this example a tomato 140, is presented to the POS terminal 105 for identification and purchase. The store server 135 maintains information about the POS terminal 105 and item lookup data.

Figure 2:
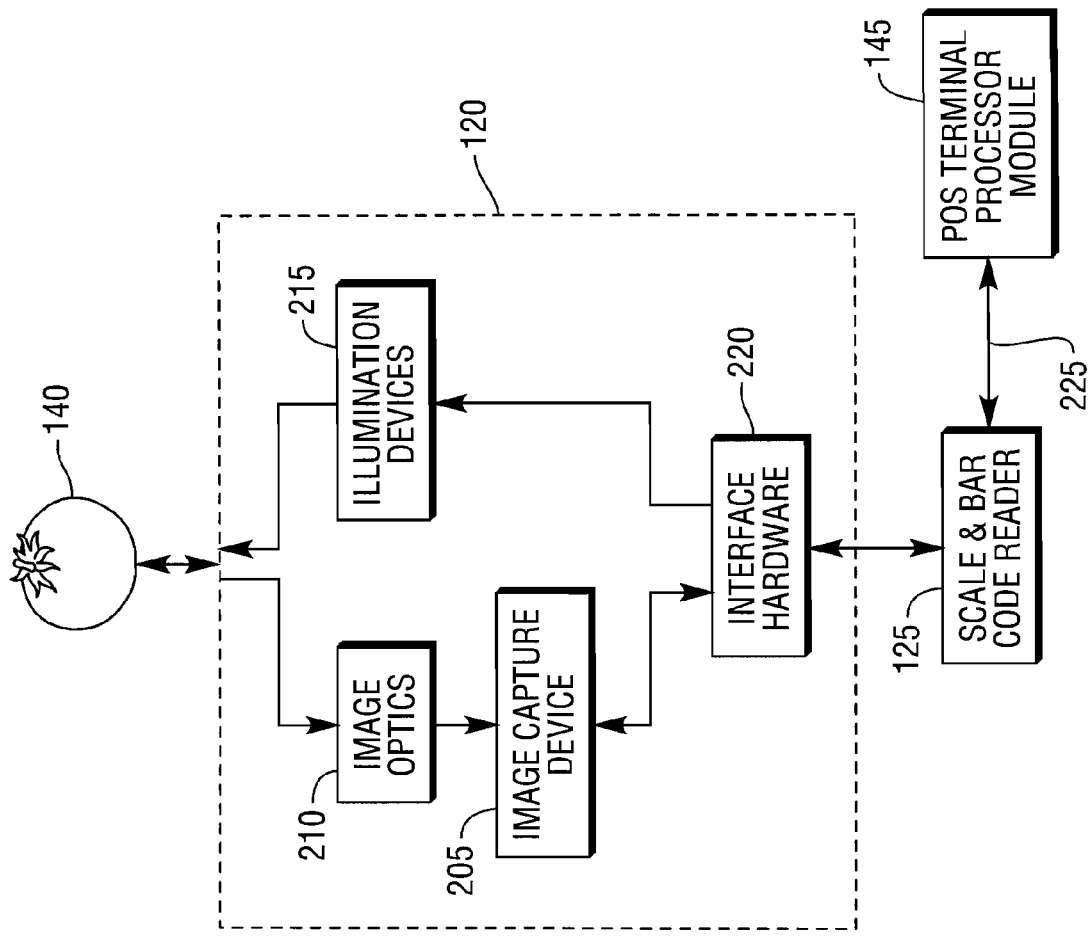
FIG. 2 illustrates an expanded high-level block diagram of the produce imaging hardware.

Referring now to FIG. 2, there is provided an expanded high-level block diagram of the produce imaging hardware 120. The produce imaging hardware 120 includes illumination devices 215 used to illuminate the unlabeled produce item 140 and image optics 210 that direct light reflected from the produce item 140 to an image capture device 205 where an image of the produce item 140 is captured. Interface hardware 220 allows external devices to access and control the components and features of the produce imaging hardware 120. In this embodiment, the produce imaging hardware 120 is co-located with the scale and bar code reader 125 and communicates with the POS terminal processor module 145 through the same data interface 225 used by the scale and bar code reader 125. In other embodiments, the produce imaging hardware 120 is separate from the scale and bar code reader 125 and the produce imaging hardware 120 communicates directly with the POS terminal 105. In still other embodiments, the produce imaging hardware 200 is highly integrated into the scale and bar code reader 125 and the two functions share a number of components such as a common image capture device 205 and image optics 210.

Figure 3:
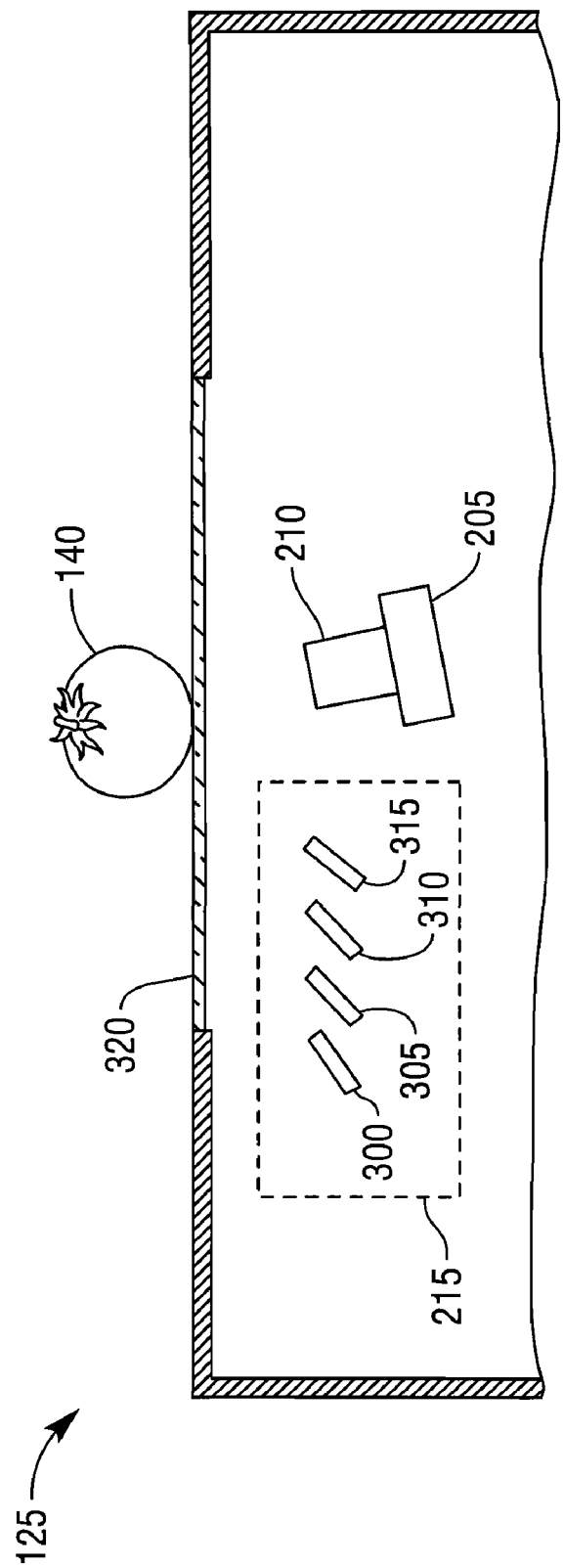
FIG. 3 illustrates a partial cross section of a scale and bar code reader.

Turning to FIG. 3, there is provided a partial cross section of the scale and bar code reader 125. The components specific to the scale and bar code functions have been omitted from the figure. Only the housing and produce imaging hardware 120 are depicted. The illumination devices 215 include four different types of LEDs positioned to direct light at a location on the surface of the scale's top plate 320 where the unlabeled produce item 140 is placed for identification. Each of the four different types of LEDs produces light at a different primary wavelength and can be operated independently from the other types. Additional LEDs of each type can be added to increase light intensity for each type. The first type of LED 300 produces light primary in the infrared light spectrum (e.g., 930 nm). The second type of LED 305 produces primary a visible blue light (e.g., light with a wavelength between 490-450 nm). The third type of LED 310 produces primary a visible green light (e.g., light with a wavelength between 560-490 nm) and the fourth type of LED 315 produces primary a visible red light (e.g., light with a wavelength between 700-

635 nm). The image capture device 205 detects and captures images using light reflected from each of the different LEDs 305. The image optics 210 focus and direct the reflected light to the image capture device 205.

In some embodiments, polarizing filters are included in the image optics 210 to reduce specular reflections from the produce item or from a plastic bag. Some produce items are placed in a plastic bag prior to purchase. The items are then presented to the POS terminal 105 for purchase still within the plastic bags. It is possible to identify produce items through clear plastic bags but specular reflections from the plastic bags must be limited or the images of the produce items within the plastic bags will be of poor quality making it difficult or impossible to identify the items. The use of polarizing filters reduces the specular reflections from the plastic bag and from the produce items.

Figure 4:
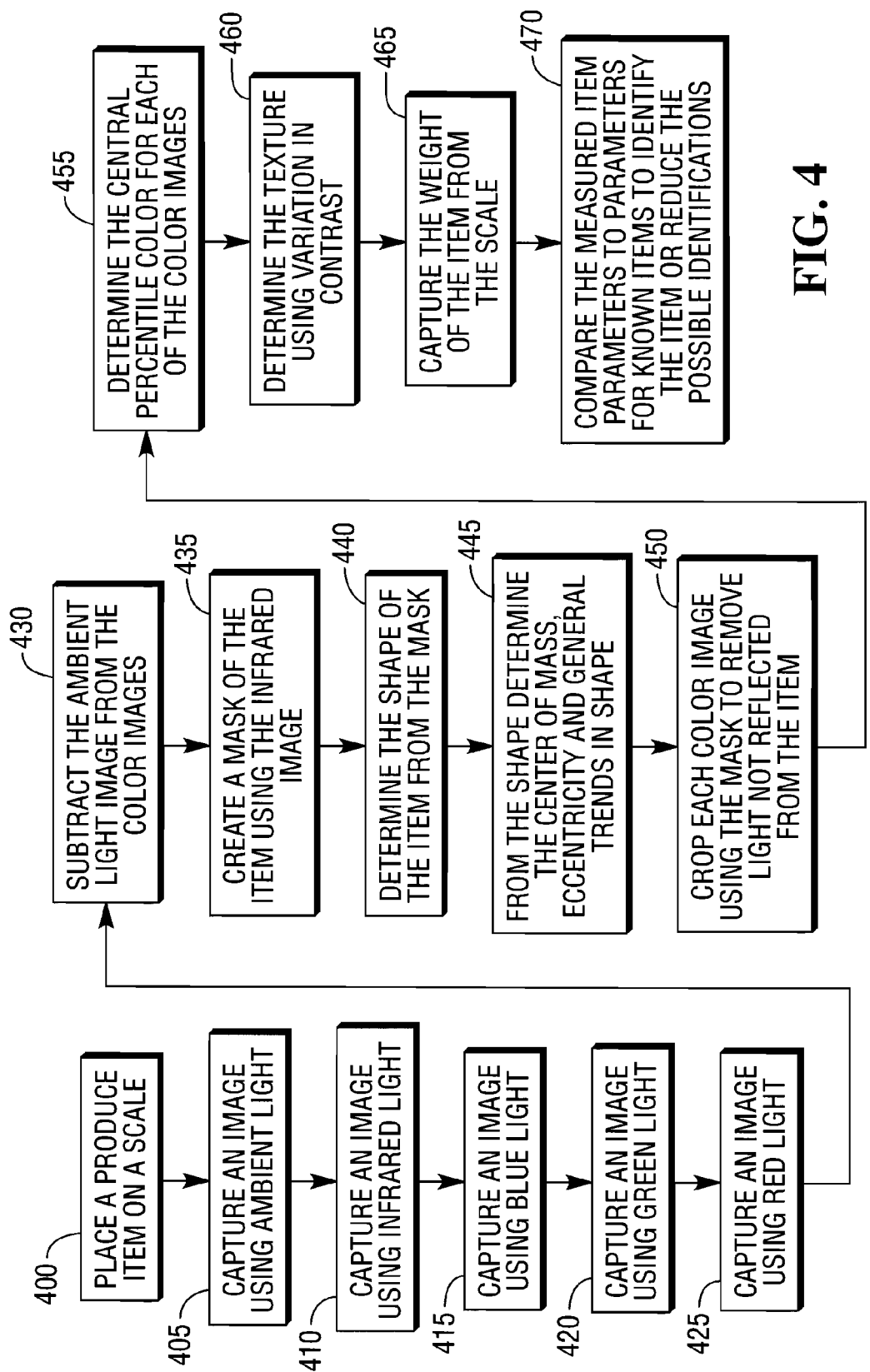
FIG. 4 illustrates a high-level flow diagram illustrating the steps used to identify a produce item presented to a POS terminal for purchase.

Referring to FIG. 4, there is provided a high-level flow diagram illustrating the steps used to identify a produce item presented to a POS terminal 105 for purchase. The produce item 140 is placed on the scale and bar code reader 125 for identification and weighing (step 400). The process of identifying the produce item 140 is started by either an operator instructing the POS terminal 105 to identify the item 140 or by the POS terminal 105 determining that an unlabeled item has been placed on the scale 125. The item is determined to be unlabeled when the bar code scanner 125 fails to detect a bar code and the scales detect weight.

The produce recognition software 110 controls the produce imaging hardware 120. Each of the captured images described below are transferred to the POS terminal processor module 145 for further processing by the product recognition software 110.

The image capture device 205 which is part of the produce imaging hardware 120 captures an image of the item 140 using ambient light (step 405). During the image capture, all of the illumination devices 215 are turned off. Next, the infrared LEDs 300 that are part of the illumination devices 215 are turned on (the other illumination devices remain off) and an infrared image of the item 140 is captured by the image capture device 205 (step 410). Unlike the other LEDs which are positioned to create reflected light, the infrared LEDs 300 are positioned with reference to the image capture device 205 so that the item 140 is backlit by the infrared LEDs 300 to create an outline of the item 140. The infrared LEDs 300 are turned off and the blue LEDs 305 are turned on. The image capture device 205 then captures a blue light image (step 415). The blue LEDs 305 are turned off and the green LEDs 310 are turned on. The image capture device 205 then captures a green light image (step 420). The green LEDs 310 are turned off and the red LEDs 315 are turned on. The image capture device 205 then captures a red light image (step 425) and the red LEDs 315 are turned off. The captured blue, green and red images are referred to as the color images.

As described below, the produce recognition software 110 performs a number of image processing steps where the digital data for one or more of the captured images are mathematically transformed or operated on to generate a characteristic of the image. The color images are comprised of reflected ambient light and reflected light generated from the illumination devices 215. It is desirable for the color images to only comprise light reflected from the illumination devices 215. Therefore, the blue, green and red (color) light images are modified by subtracting the ambient light image from each of them (step 430). This operation removes the captured reflected ambient light from the original color images to create modified color images. A mask of the outline of the item 140 is created from the infrared image (step 435). The outline mask is used to determine the geometric shape of the item 140 (step 440). Using the geometric shape of the item 140, the area, center of mass, eccentricity and general trends of the shape of the item 140 are determined (step 445). The general trends of the shape include determining that the shape of the item 140 is oval, triangular, circular or amorphous. In addition, the outline mask is used to determine if the item 140 actually consist of multiple items.

Next, the blue, green and red light images are further modified by using the outline mask to crop all light not reflected by the item 140 (step 450). Using the further modified images, the central percentile color response intensity is determined for the blue, green and red light images (step 455). The central percentile color response intensity is the predominant color intensity for the item 140 after responses resulting from labels, black spots, bruises and signal noise are removed. Statistically removing the top and bottom 25% of the responses is one example of how to determine the predominant color response intensity.

The texture of the item 140 is determined by the variations in contrast from one or more of the further modified blue, green and red light images or the infrared image (step 460). If the item 140 is inside a bag, the texture may not be reliable determined. Specular light from the bag in the ambient light image is used to determine if the item 140 is inside a bag. The weight of the item 140 is captured from the scale and bar code reader 125 (step 465). The weight is then combined with the determined area of the item 140 to create a weight to area parameter.

The determined parameters (shape, texture, central percentile color response intensity, center of mass, eccentricity and general shape trends) for the item 140 are then compared to similar parameters for known items to identify the item 140 or if an exact match is not found, identify the closest matches (step 470). Not every parameter of the unknown item 140 has to match exactly to a known item's parameters to be an exact match. In some cases, not all parameters of the item 140 can be determined (e.g., the texture) but a match can still be found. When an exact match is not found, the closest match or matches are presented to the operator of the POS terminal 105 and operator selects the proper identification for the item 140.

In some embodiments, the parameters for the known items are stored in a database and the database is searched for matches. The database can be stored in the POS terminal 105 or in the store server 135. The search may return a single match or a plurality of matches that closely match. Items that are not a close match are not returned. This greatly reduces the choices that are displayed for the operator of the POS terminal 105 to select. Having fewer choices reduces the time needed to identify the item 140 and reduces the incident of identification errors.

In some embodiments, a single color image is captured with the blue 305, green 310 and red 315 LEDs all turned on. The color image is then processed to separate the blue, green and red data. This speeds up the process of identifying the produce item because two less photos are captured and the time required to the process the color image is less that the time to capture the two extra images.

In still other embodiments, LEDs that generate at least one different color other than the blue, green and red colors described above are used. Each different color would replace one of the current colors.

The above embodiments and drawings disclose a POS terminal 105 for identifying unlabeled produce items presented for purchase. In other embodiments, the apparatus and method used to identify unlabeled produce is used in systems other than a POS terminal 105. For example, the apparatus and method for identifying unlabeled produce is used in systems to identify and grade the quality or size of the produce so that similar produce can be grouped together.

Although particular reference has been made to certain embodiments, variations and modifications are also envisioned within the spirit and scope of the following claims.

What is claimed is:

1. A produce identification apparatus for identifying a produce item, the apparatus comprising:
   a processor where the processor controls the elements and functions of the apparatus;
   a plurality of illumination devices where the illumination devices are controlled by the processor to emit, at different times, light energy primarily having a first, second, third and fourth wavelength to illuminate the produce item;
   an image capture device controlled by the processor where the image capture device captures images of the produce item for processing by the processor;
   a first image of the produce item captured by the image capture device where the illumination devices are turned off and the produce item is illuminated by ambient light;
   a second image of the produce item captured by the image capture device where the produce item is illuminated by light from the illumination devices emitting primarily the first wavelength;
   a third image of the produce item captured by the image capture device where the produce item is illuminated by light from the illumination devices emitting primarily the second wavelength;
   a fourth image of the produce item captured by the image capture device where the produce item is illuminated by light from the illumination devices emitting primarily the third wavelength;
   a fifth image of the produce item captured by the image capture device where the produce item is illuminated by light from the illumination devices emitting primarily the fourth wavelength; and
   where the processor determines when the produce item is inside a plastic bag by determining the presences of specular light in the first captured image, determines physical parameters of the produce item from the captured images, and compares the determined parameters to parameters of known produce to identify the produce item.

2. The apparatus of claim 1, wherein:
   light at the first wavelength is primarily comprised of infrared light;
   light at the second wavelength is primarily comprised of blue light;
   light at the third wavelength is primarily comprised of green light; and
   light at the fourth wavelength is primarily comprised of red light.

3. The apparatus of claim 1, wherein the physical parameters of the produce item include a shape, central percentile color response intensity, and center of mass.

4. The apparatus of claim 1, further comprising a weight scale in communication with the processor where the produce item is placed on the scale and the processor uses the communicated weight of the produce item in determining at least one of the parameters of the produce item.

5. The apparatus of claim 4, wherein the physical parameters of the produce item further include a weight to area.

6. The apparatus of claim 1, where the apparatus is a point of sale terminal and the produce item is being presented for purchase at the terminal.

7. A computer implemented method for identifying a produce item, the method comprising:
   determining the presence of the produce item;
   capturing a first image of the produce item using ambient light;
   illuminating the produce item with light primarily at a first wavelength primarily comprised of infrared light;
   capturing a second image of the produce item illuminated by light primarily at the first wavelength;
   illuminating the produce item with light primarily at a second wavelength primarily comprised of blue light;
   capturing a third image of the produce item illuminated by light primarily at the second wavelength;
   illuminating the produce item with light primarily at a third wavelength primarily comprised of green light;
   capturing a fourth image of the produce item illuminated by light primarily at the third wavelength;
   illuminating the produce item with light primarily at a fourth wavelength primarily comprised of red light;
   capturing a fifth image of the produce item illuminated by light primarily at the fourth wavelength;
   determining physical parameters of the produce item from the captured images including digitally removing ambient light by subtracting the first captured image from each of the third, fourth and fifth captured images; and
   comparing the determined parameters to parameters of known produce to identify the produce item.

8. The method of claim 7, wherein determining physical parameters includes determining a shape, central percentile color response intensity, and center of mass of the produce item.

9. The method of claim 7, wherein determining physical parameters further includes digitally processing the second captured image to determine an outline of the produce item and using the outline to determine physical parameters.

10. The method of claim 9, wherein determining physical parameters further includes digitally cropping the third, fourth and fifth captured images removing all information outside the outline of the produce item and using the cropped images determining a central percentile color response intensity for each of the third, fourth and fifth captured images.

11. The method of claim 7, further comprising determining a weight of the produce item using a weight scale and using the weight determining at least one physical parameter of the produce item.

12. The method of claim 11, wherein determining physical parameters includes determining a texture of the produce item when the produce item is not inside a plastic bag.

13. The method of claim 7, further comprising determining the produce item is not inside a plastic bag by determining the absence of specular light in the first captured image.

14. A computer implemented method for identifying a produce item, the method comprising:
   determining the presence of the produce item;
   capturing a first image of the produce item using ambient light;
   determining that the produce item is not inside a plastic bag by determining the absence of specular light in the first captured image;
   illuminating the produce item with light primarily at a first wavelength;
   capturing a second image of the produce item illuminated by light primarily at the first wavelength;
   illuminating the produce item with light primarily at a second wavelength;
   capturing a third image of the produce item illuminated by light primarily at the second wavelength;

illuminating the produce item with light primarily at a third wavelength;
capturing a fourth image of the produce item illuminated by light primarily at the third wavelength;
illuminating the produce item with light primarily at a fourth wavelength;
capturing a fifth image of the produce item illuminated by light primarily at the fourth wavelength;
determining physical parameters of the produce item from the captured images; and
comparing the determined parameters to parameters of known produce to identify the produce item.

15. A computer implemented method for identifying a produce item, the method comprising:
determining the presence of the produce item;
capturing a first image of the produce item using substantially white light;
illuminating the produce item with light primarily at a first wavelength primarily comprised of infrared light;
capturing a second image of the produce item illuminated by light primarily at the first wavelength;
obtaining a third image of the produce item at a second wavelength;
digitally creating an outline mask of the produce item from the second image;
cropping the third image using the outline mask to produce a fourth image; and
determining physical parameters of the produce item from the fourth image; and
comparing the determined parameters to parameters of known produce to identify the produce item.

16. The method of claim 15, wherein obtaining the third image comprises:
illuminating the produce item with light primarily at the second wavelength;
capturing a fifth image of the produce item illuminated by the light primarily at the second wavelength; and
digitally subtracting the first captured image from the fifth captured image to produce the third image.

17. The method of claim 15, wherein obtaining the third image comprises:
digitally removing all but the second wavelength of light from the first captured image to produce the third image.

18. The method of claim 15, further comprising:
determining the produce item is not inside a plastic bag by determining the absence of specular light in the first captured image.

19. The method of claim 15, further comprising:
determining variations in contrast within the third image; and
determining texture of the produce items from the variations in contrast.

* * * * *